(12) United States Patent (10) Patent No.: US 12,613,122 B2

Mattero et al. (45) Date of Patent: Apr. 28, 2026

---

(54) SYSTEM AND METHOD FOR MEASURING STATIC VOLUME IN A MATERIAL CONTAINER

(71) Applicant: Illinois Tool Works Inc., Glenview, IL (US)

(72) Inventors: Patsy A. Mattero, Smithfield, RI (US); David Ethan Fatheree, Roxbury Crossing, MA (US); James Lynch, Uxbridge, MA (US)

(73) Assignee: Illinois Tool Works Inc., Glenview, IL (US)

( * ) Notice: Subject to any disclaimer, the term of this patent is extended or adjusted under 35 U.S.C. 154(b) by 273 days.

(21) Appl. No.: 18/503,581

(22) Filed: Nov. 7, 2023

(65) Prior Publication Data

US 2025/0146857 A1 May 8, 2025

(51) Int. Cl.
G01F 22/00 (2006.01)
G01F 3/00 (2006.01)

(52) U.S. Cl.
CPC ............... G01F 22/00 (2013.01); G01F 3/00 (2013.01)

(58) Field of Classification Search
None
See application file for complete search history.

(56) References Cited

U.S. PATENT DOCUMENTS

| | | | | |
|---|---|---|---|---|
| 2016/0005668 A1* | 1/2016 | Donner | ................... | B05B 15/50 |
| | | | | 222/1 |
| 2016/0193619 A1* | 7/2016 | des Jardins | ........... | B05C 11/101 |
| | | | | 222/25 |

FOREIGN PATENT DOCUMENTS

| | | |
|---|---|---|
| JP | H01-249162 A | 10/1989 |
| JP | 2005-131541 A | 5/2005 |
| JP | 2013-044434 A | 3/2013 |
| JP | 2015-524156 A | 8/2015 |

* cited by examiner

*Primary Examiner* — Eric S. McCall
*Assistant Examiner* — Nigel H Plumb
(74) *Attorney, Agent, or Firm* — Lando & Anastasi, LLP

(57) ABSTRACT

An apparatus is configured to dispense assembly material on an electronic substrate. The apparatus includes a frame and a unit coupled to the frame. The unit includes a material cartridge coupled to a pressure regulator configured to deliver pressurized air to the material cartridge at a desired pressure. The material cartridge is configured to contain assembly material. The apparatus further includes a substrate support configured to support the electronic substrate and a controller configured to control the apparatus including the unit. A system to detect static volume in the material cartridge includes a mass flow meter to measure a volume of air delivered to the material cartridge. The controller is configured to determine a volume of assembly material in the material cartridge upon determining the volume of air in the material cartridge.

28 Claims, 5 Drawing Sheets

5

SYSTEM AND METHOD FOR MEASURING STATIC VOLUME IN A MATERIAL CONTAINER

BACKGROUND OF THE DISCLOSURE

1. Field of Invention

This application relates generally to apparatus, including stencil printers and dispensers, which are used to print and deposit viscous materials, e.g., solder paste, on an electronic substrate, e.g., a printed circuit board (PCB), and more particularly to systems and methods for measuring a volume of viscous material within a material container of the apparatus.

2. Discussion of Related Art

In manufacturing a surface-mount printed circuit board, a stencil printer can be used to print solder paste onto the circuit board. Typically, a circuit board having a pattern of pads or some other conductive surface onto which solder paste will be deposited is automatically fed into the stencil printer; and one or more small holes or marks (known as "fiducials") on the circuit board are used to properly align the circuit board with the stencil or screen of the stencil printer prior to printing solder paste onto the circuit board. In some systems, an optical alignment system embodying an imaging or vision system is used to align the circuit board with the stencil.

Once the circuit board has been properly aligned with the stencil in the printer, the circuit board is raised to the stencil, solder paste is dispensed onto the stencil, and a wiper blade (or squeegee) traverses the stencil to force the solder paste through apertures in the stencil and onto the circuit board. As the squeegee is moved across the stencil, the solder paste tends to roll in front of the blade, which desirably causes mixing and shearing of the solder paste so as to attain a desired viscosity to facilitate filling of the apertures in the screen or stencil. The solder paste typically is dispensed onto the stencil from a standard cartridge. The stencil is then separated from the circuit board and the adhesion between the circuit board and the solder paste causes most of the material to stay on the circuit board. Material left on the surface of the stencil is removed in a cleaning process before additional circuit boards are printed.

Similarly, with another type of equipment used to manufacture a surface-mount printed circuit board, a dispensing system can be used to dispense viscous material onto the circuit board. There are several types of dispensing systems used to dispense precise amounts of liquid or paste for a variety of applications. One such application is the assembly of integrated circuit chips and other electronic components onto circuit board substrates. In this application, automated dispensing systems are used for dispensing dots of liquid epoxy or solder paste, or some other related material, onto printed circuit boards. Automated dispensing systems are also used for dispensing lines of underfill materials and encapsulants, which may be used to mechanically secure components to the printed circuit board.

In a typical dispensing system, a dispensing unit is mounted to a moving assembly or gantry for moving the dispensing unit along three mutually orthogonal axes (x-axis, y-axis, and z-axis) using servomotors controlled by a computer system or controller. To dispense a dot of liquid on a printed circuit board or other substrate at a desired location, the dispensing unit is moved along the co-planar horizontal x-axis and y-axis directions until the dispensing unit is located over the desired location. The dispensing unit is then lowered along the perpendicularly oriented vertical z-axis direction until a nozzle/needle of the dispensing unit and dispensing system is at an appropriate dispensing height over the electronic substrate. The dispensing unit dispenses a dot of liquid, is then raised along the z-axis, moved along the x- and y-axes to a new location, and is lowered along the z-axis to dispense the next liquid dot. For applications such as encapsulation or dispensing of underfill as described above, the dispensing unit is typically controlled to dispense lines of material as the dispensing unit is moved in the x- and y-axes along the desired path of the lines. For some types of dispensing units, such as jetting pumps, the z-axis movement prior to and subsequent to a dispense operation may not be required.

Dispenser material cartridges provided in stencil printers and dispensers have a finite volume and are known to work within a certain pressure range. For a variety of reasons, it is desirable to know the amount of material within the cartridge. Also, knowing that the cartridge when new has a starting volume that is less than 100% of a maximum volume of the cartridge, which is the starting point to measure the material contents of the cartridge, poses a problem with identifying the amount of material in the cartridge.

SUMMARY OF THE DISCLOSURE

One aspect of the present disclosure is directed to an apparatus configured to dispense assembly material on an electronic substrate. In one embodiment, the apparatus comprises a frame and a unit coupled to the frame. The unit is configured to deposit assembly material on the electronic substrate. The unit includes a material cartridge coupled to a pressure regulator configured to deliver pressurized air to the material cartridge at a desired pressure. The material cartridge is configured to contain assembly material. The apparatus further comprises a substrate support assembly coupled to the frame. The substrate support assembly is configured to support the electronic substrate. The apparatus further comprises a controller configured to control the apparatus including the unit and a system to detect static volume in the material cartridge. The system includes a mass flow meter to measure a volume of air delivered to the material cartridge. The controller further is configured to determine a volume of assembly material in the material cartridge upon determining the volume of air in the material cartridge.

Embodiments of the apparatus further may include configuring the cartridge to include a cylindrical body having an open upper end and a tapered lower end having a relatively smaller opening to dispense assembly material from the cartridge. The cartridge further may include a piston disposed within the cylindrical body, with the piston providing pressure on assembly material disposed in a chamber below the piston. The cartridge further may include a cap provided within the open end of the body to enclose the open end of the cartridge. The cap of the cartridge may be connected to a tube in fluid communication with the pressure regulator to provide pressurized air into a chamber above the piston to force assembly material out of the cartridge. The mass flow meter may be disposed between the pressure regulator and the cap of the cartridge. The mass flow meter may be placed downstream from the pressure regulator to measure a flow rate of air through the tube for a calculated time interval to determine the volume of empty space within the chamber above the piston within the body of the cartridge to determine the volume of assembly material in the chamber below the piston within the body of the cartridge. The lower end of the body may include a nozzle to meter out a controlled amount of assembly material during use. The cartridge may be fabricated from a plastic material that is transparent or translucent to enable visual detection of an amount of assembly material in the cartridge. The pressure regulator may include a control circuit coupled to the controller, a first control valve, and a second control valve, with the first control valve and the second control valve being coupled to the control circuit. A source of air pressure may be connected to the pressure regulator by a solenoid valve, which is coupled to the controller. The controller further may be configured to determine a replacement schedule for the material cartridge and to provide notification.

Another aspect of the present disclosure is directed to a system to detect static volume in the material cartridge. In one embodiment, the system comprises a mass flow meter to measure a volume of air delivered to the material cartridge. A controller is configured to determine a volume of assembly material in the material cartridge upon determining the volume of air in the material cartridge.

Embodiments of the system further may include configuring the cartridge to include a cylindrical body having an open upper end and a tapered lower end having a relatively smaller opening to dispense assembly material from the cartridge. The cartridge further may include a piston disposed within the cylindrical body, with the piston providing pressure on assembly material disposed in a chamber below the piston. The cartridge further may include a cap provided within the open end of the body to enclose the open end of the cartridge. The cap of the cartridge may be connected to a tube in fluid communication with the pressure regulator to provide pressurized air into a chamber above the piston to force assembly material out of the cartridge. The mass flow meter may be disposed between the pressure regulator and the cap of the cartridge. The mass flow meter may be placed downstream from the pressure regulator to measure a flow rate of air through the tube for a calculated time interval to determine the volume of empty space within the chamber above the piston within the body of the cartridge to determine the volume of assembly material in the chamber below the piston within the body of the cartridge. The lower end of the body may include a nozzle to meter out a controlled amount of assembly material during use. The cartridge may be fabricated from a plastic material that is transparent or translucent to enable visual detection of an amount of assembly material in the cartridge. The pressure regulator may include a control circuit coupled to the controller, a first control valve, and a second control valve, with the first control valve and the second control valve being coupled to the control circuit. A source of air pressure may be connected to the pressure regulator by a solenoid valve, which is coupled to the controller. The controller further may be configured to determine a replacement schedule for the material cartridge and to provide notification.

Yet another aspect of the present disclosure is directed to a method to detect static volume in the material cartridge. In one embodiment, the method comprises measuring a volume of air delivered to a material cartridge. A controller is configured to determine a volume of assembly material in the material cartridge upon determining the volume of air in the material cartridge.

Embodiments of the method further may include measuring a volume of air by a mass flow meter positioned between the material cartridge and a pressure regulator. The cartridge may include a cylindrical body having an open upper end and a tapered lower end having a relatively smaller opening to dispense assembly material from the cartridge, a piston disposed within the cylindrical body, with the piston providing pressure on assembly material disposed in a chamber below the piston, and a cap provided within the open end of the body to enclose the open end of the cartridge. The method further may include providing pressurized air into a chamber above the piston to force assembly material out of the cartridge. The method further may include positioning the mass flow meter between the pressure regulator and the cap of the cartridge. The method further may include positioning the mass flow meter downstream from the pressure regulator to measure a flow rate of air through the tube for a calculated time interval to determine the volume of empty space within the chamber above the piston within the body of the cartridge to determine the volume of assembly material in the chamber below the piston within the body of the cartridge.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
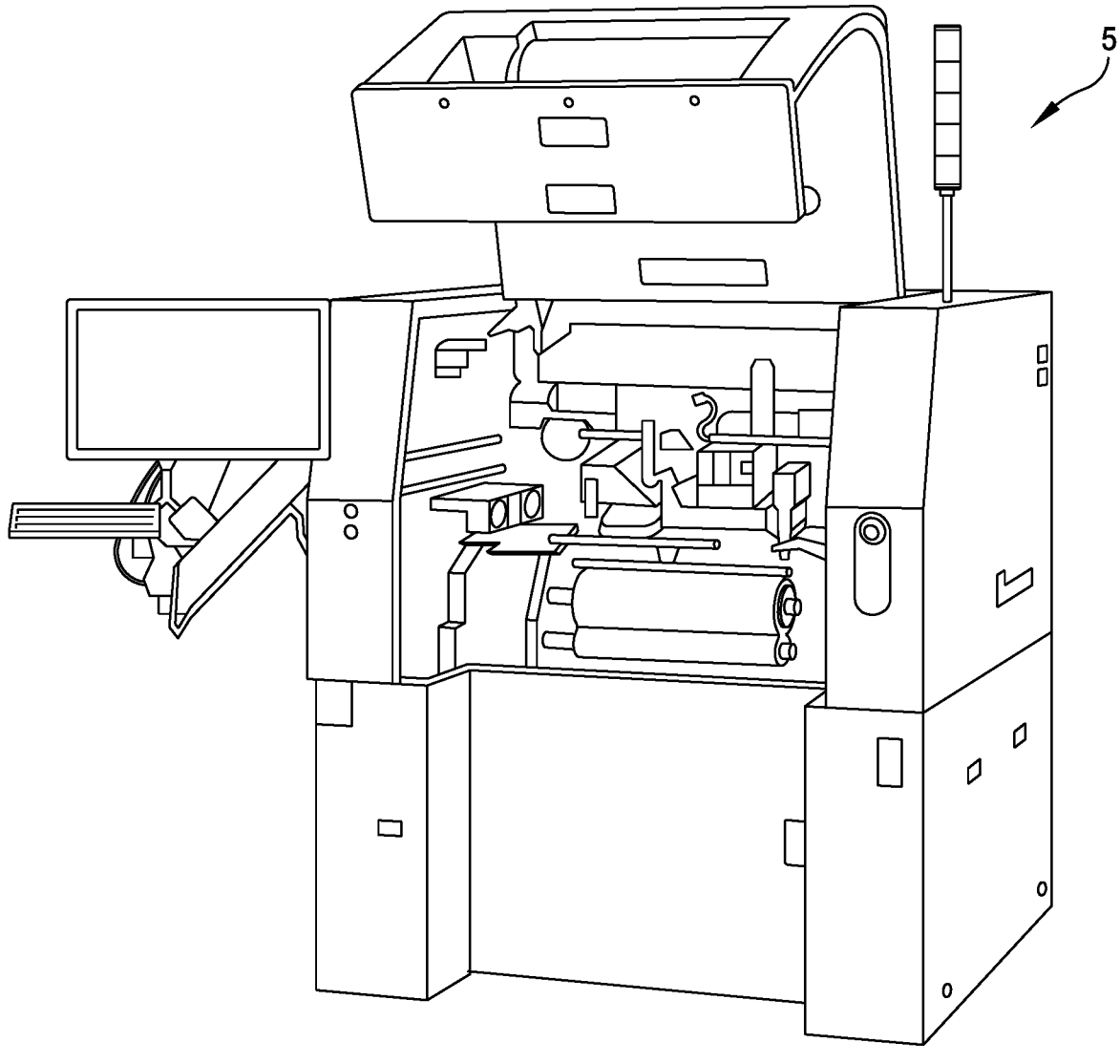
FIG. 1 is a front perspective view of a stencil printer.

The present disclosure relates generally to material application machines (referred to herein as "stencil printers," "screen printers," "printing machines," or "printers") and other equipment utilized in a surface mount technology (SMT) process lines and configured to apply an assembly material (e.g., solder paste, conductive ink, or encapsulation material) onto a substrate (e.g., a printed circuit board, referred to herein as an "electronic substrate," a "circuit board," a "board," a "PCB," a "PCB substrate," a "substrate," or a "PCB board") or to perform other operations, such as inspection, rework, or placement of electronic components onto a substrate. Specifically, embodiments of the present disclosure are described below with reference to stencil printers used to produce printed circuit boards.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

For purposes of illustration, embodiments of the present disclosure will now be described with reference to a stencil printer used to print an assembly material, such as solder paste, onto a circuit board. One skilled in the art will appreciate, however, that embodiments of the present disclosure are not limited to stencil printers that print solder paste onto circuit boards, but rather, may be used in other applications requiring dispensing of other viscous assembly materials, such as glues and encapsulents. For example, the apparatus may be used to print epoxy for use as underfill for chip-scale packages. Further, stencil printers in accordance with embodiments of the present disclosure are not limited to those that print assembly materials on circuit boards, but rather, include those used for printing other materials on a variety of substrates, such as semiconductor wafers. Also, the terms screen and stencil may be used interchangeably herein to describe a device in a printer that defines a pattern to be printed onto a substrate. In certain embodiments, the stencil printer may include a Momentum® or an Edison™ series stencil printer platform offered by ITW Electronic Assembly Equipment of Hopkinton, Massachusetts. An exemplary stencil printer is generally designated at 5 in FIG. 1. In this embodiment, the stencil printer 5 is an Edison® series stencil printer platform offered by ITW Electronic Assembly Equipment of Hopkinton, Massachusetts.

Figure 2:
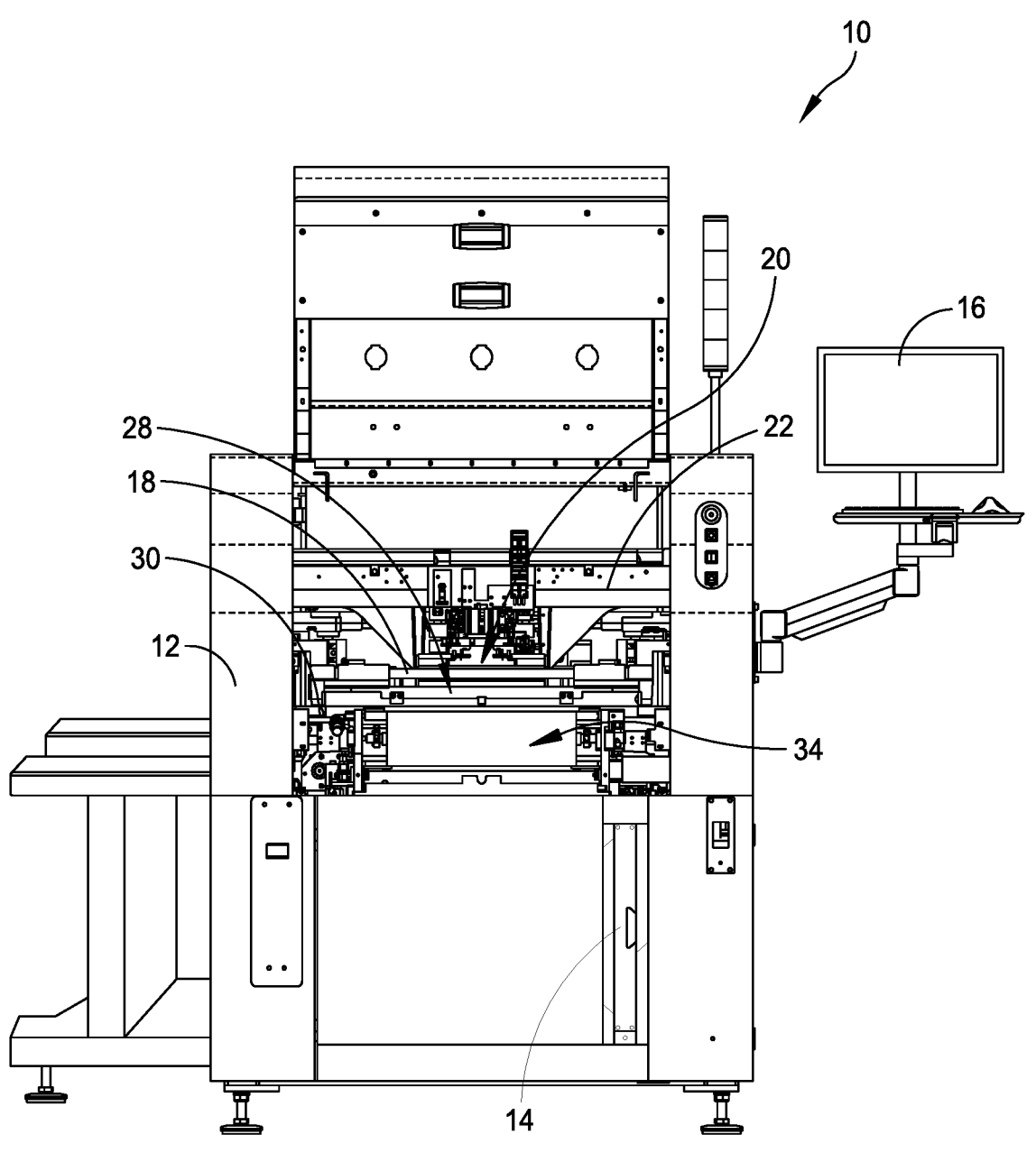
FIG. 2 is a front view of a stencil printer.

Referring to FIG. 2, there is generally indicated at 10 a stencil printer of an embodiment of the disclosure. As shown, the stencil printer 10 includes a frame 12 that supports components of the stencil printer. The components of the stencil printer may include, in part, a controller 14, a display 16, a stencil 18, and a print head or print head assembly, generally indicated at 20, which is configured to apply the solder paste in a manner described in greater detail below.

As shown in FIG. 2 and described below, the stencil and the print head assembly may be suitably coupled or otherwise connected to the frame 12. In one embodiment, the print head assembly 20 may be mounted on a print head assembly gantry 22, which may be mounted on the frame 12. The print head assembly gantry 22 enables the print head assembly 20 to be moved in the y-axis direction under the control of the controller 14 and to apply pressure on the print head assembly as it engages the stencil 18. In a certain embodiment, the print head assembly 20 may be placed over the stencil 18 and may be lowered in the z-axis direction into contact with the stencil to make a seal with the stencil.

The stencil printer 10 may also include a conveyor system having rails (not shown) for transporting a printed circuit board (sometimes referred to as a "printed wiring board,"

"substrate," or "electronic substrate" herein) to a print position in the stencil printer. The rails sometimes may be referred to herein as a "tractor feed mechanism," which is configured to feed, load or otherwise deliver circuit boards to the working area of the stencil printer, which may be referred to herein as a "print nest," and to unload circuit boards from the print nest.

Figure 3:
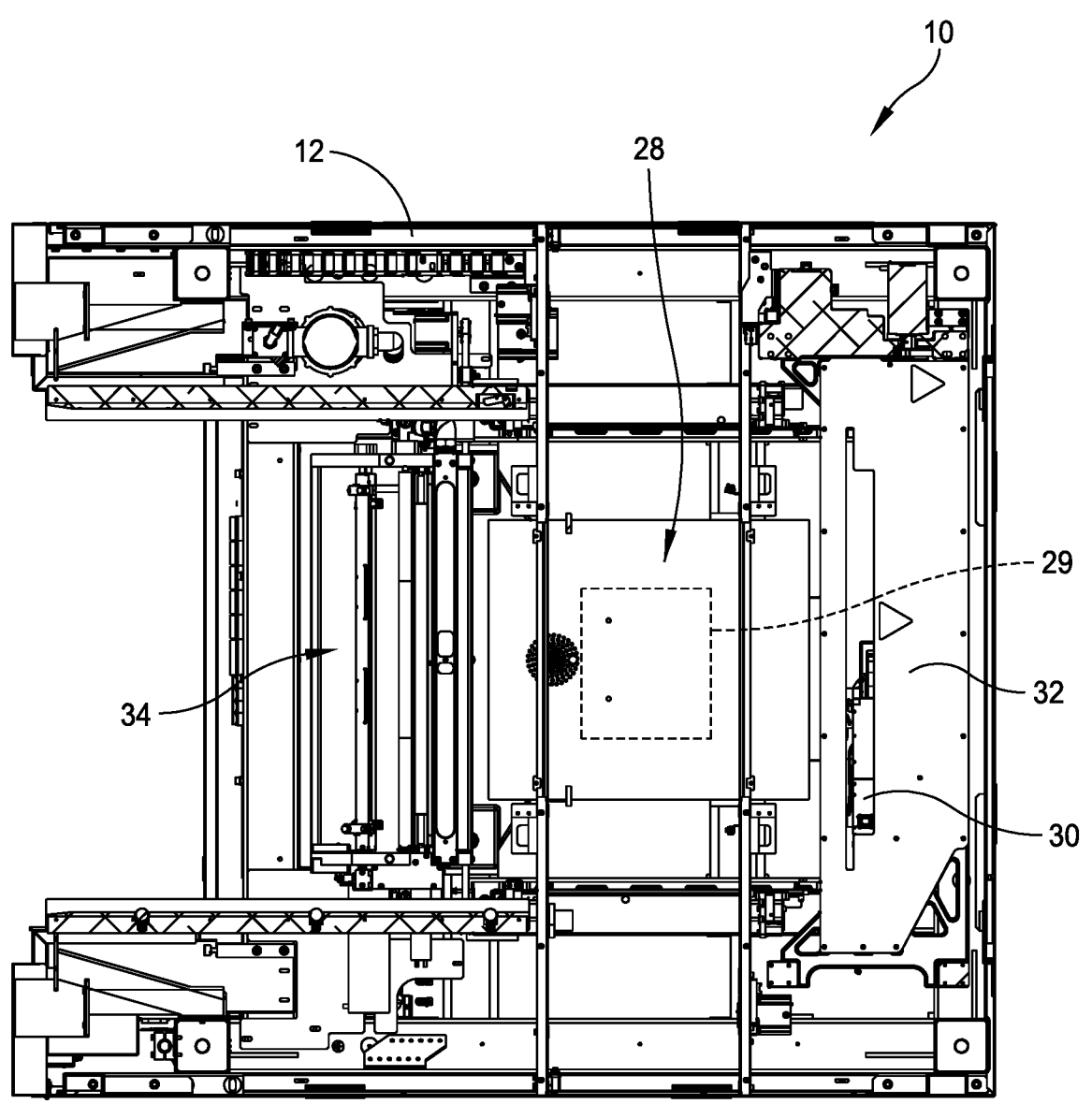
FIG. 3 is a top plan view of the stencil printer illustrated in FIG. 2 with portions removed.

Referring additionally to FIG. 3, the stencil printer 10 has a support assembly 28 to support the circuit board 29 (shown in dashed lines), which raises and secures the circuit board so that it is stable during a print operation. In certain embodiments, the substrate support assembly 28 further may include a particular substrate support system, e.g., a solid support, a plurality of pins or flexible tooling, which is positioned beneath the circuit board when the circuit board is in the print position. The substrate support system may be used, in part, to support the interior regions of the circuit board to prevent flexing or warping of the circuit board during the print operation.

In one embodiment, the print head assembly 20 may be configured to receive solder paste from a source, such as a dispenser, e.g., a solder paste cartridge, which provides solder paste to the print head assembly during the print operation. Other methods of supplying solder paste may be employed in place of the cartridge. For example, solder paste may be manually deposited between the blades or from an external source. Additionally, in a certain embodiment, the controller 14 may be configured to use a personal computer having a suitable operating system, such as a Microsoft Windows® operating system provided by Microsoft Corporation, with application specific software to control the operation of the stencil printer 10. The controller 14 may be networked with a master controller that is used to control a production line for fabricating circuit boards.

In one configuration, the stencil printer 10 operates as follows. A circuit board 29 is loaded into the stencil printer 10 using the conveyor rails. The support assembly 28 raises and secures the circuit board 29 to a print position. The print head assembly 20 is then lowered in the z-axis direction until blades of the print head assembly contact the stencil 18 at a desired pressure. The print head assembly 20 is then moved in the y-axis direction across the stencil 18 by the print head assembly gantry 22. The print head assembly 20 deposits solder paste through apertures in the stencil 18 and onto the circuit board 29. Once the print head assembly has fully traversed the stencil 18 across the apertures, the print head assembly is lifted off the stencil and the circuit board 29 is lowered back onto the conveyor rails. The circuit board 29 is released and transported from the stencil printer 10 so that a second circuit board may be loaded into the stencil printer. To print on the second circuit board 29, the print head assembly is lowered in the z-axis direction into contact with the stencil and moved across the stencil 18 in the direction opposite to that used for the first circuit board.

An imaging system 30 may be provided for the purposes of aligning the stencil 18 with the circuit board 29 prior to printing and to inspect the circuit board after printing. In one embodiment, the imaging system 30 may be disposed between the stencil 18 and the support assembly 28 upon which a circuit board is supported. The imaging system 30 is coupled to an imaging gantry 32 to move the imaging system. In one embodiment, the imaging gantry 32 may be coupled to the frame 12, and includes a beam that extends between side rails of the frame 12 to provide back and forth movement of the imaging system 30 over the circuit board 29 in a y-axis direction. The imaging gantry 32 further may include a carriage device, which houses the imaging system 30, and is configured to move along the length of the beam in an x-axis direction. The construction of the imaging gantry 32 used to move the imaging system 30 is well known in the art of solder paste printing. The arrangement is such that the imaging system 30 may be located at any position below the stencil 18 and above the circuit board 29 to capture an image of predefined areas of the circuit board or the stencil, respectively.

After one or more applications of the solder paste to circuit boards, excess solder paste may accumulate at the bottom of the stencil 18 and a stencil wiper assembly, generally indicated at 34, and may move beneath the stencil to remove the excess solder paste. In other embodiments, the stencil 18 may be moved over the stencil wiper assembly.

Figure 4:
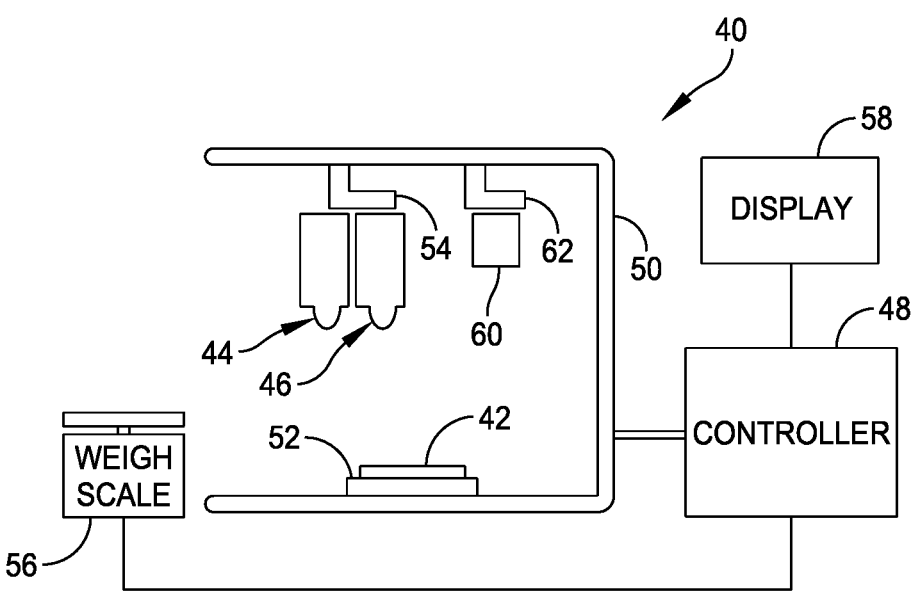
FIG. 4 is a schematic view of a dispensing system.

FIG. 4 schematically illustrates a dispensing system, generally indicated at 40, according to one embodiment of the present disclosure. The dispensing system 40 is used to dispense a viscous material (e.g., an adhesive, encapsulant, epoxy, solder paste, underfill material, etc.) or a semi-viscous material (e.g., soldering flux, etc.) onto an electronic substrate 42, such as a printed circuit board or semiconductor wafer. The dispensing system 40 may alternatively be used in other applications, such as for applying automotive gasketing material or in certain medical applications or for applying conductive inks. It should be understood that references to viscous or semi-viscous materials, as used herein, are exemplary and intended to be non-limiting. In one embodiment, the dispensing system 40 includes first and second dispensing units, generally indicated at 44 and 46, respectively, and a controller 48 to control the operation of the dispensing system. It should be understood that dispensing units 44, 46 also may be referred to herein as dispensing pumps and/or dispensing heads. Although two dispensing units 44, 46 are shown, it should be understood that a single dispensing unit or multiple dispensing units can be employed.

The dispensing system 40 may also include a frame 50 having a base or support 52 for supporting the electronic substrate, a dispensing unit gantry 54 movably coupled to the frame for supporting and moving the dispensing units 44, 46, and a weight measurement device or weigh scale 56 for weighing dispensed quantities of the viscous material, for example, as part of a calibration procedure, and providing weight data to the controller 48. A conveyor system (not shown) or other transfer mechanism, such as a walking beam, may be used in the dispensing system 40 to control loading and unloading of electronic substrates 42 to and from the dispensing system. The gantry 54 can be moved using motors under the control of the controller 48 to position the dispensing units 44, 46 at predetermined locations over the electronic substrate 42. The dispensing system 40 may include a display unit 58 connected to the controller 48 for displaying various information to an operator. There may be an optional second controller for controlling the dispensing units. Also, each dispensing unit 44, 46 can be configured with a z-axis sensor, e.g., a laser, to detect a height at which the dispensing unit is disposed above the electronic substrate 42 or above a feature mounted on the electronic substrate. The z-axis sensor is coupled to the controller 48 to relay information obtained by the sensor to the controller.

Prior to performing a dispensing operation, as described above, the electronic substrate 42, e.g., the printed circuit board, must be aligned or otherwise in registration with a dispensing unit 44 and/or 46 of the dispensing system 40. The dispensing system 40 further includes a vision system 60, which, in one embodiment, is coupled to a vision system gantry 62 movably coupled to the frame 50 for supporting and moving the vision system. In another embodiment, the vision system 60 may be provided on the gantry 54 used to move the dispensing units 44, 46. As described, the vision system 60 is employed to verify the location of landmarks, known as fiducials, targets or reference points, on the electronic substrate 42. Once located, the controller 48 can be programmed to manipulate the movement of one or more of the dispensing units 44, 46 to dispense material on the electronic substrate 42.

Systems and methods of the present disclosure may be directed to dispensing material onto an electronic substrate 42, e.g., a printed circuit board. The description of the systems and methods provided herein reference exemplary electronic substrates (e.g., printed circuit boards), which are supported on the support 52 of the dispensing system 40. In one embodiment, the dispense operation is controlled by the controller 48, which may include a computer system configured to control material dispensing units. In another embodiment, the controller 48 may be manipulated by an operator. The controller 48 is configured to manipulate the movement of the vision system gantry 62 to move the vision system 60 so as to obtain one or more images of the electronic substrate 42. The controller 48 further is configured to manipulate the movement of the gantry 54 to move the dispensing units 44, 46 to perform dispensing operations.

The methods disclosed herein further support the use of various types of dispensing units, including, but not limited to, auger, piston, time and pressure, and jetting pumps.

In one embodiment, an exemplary dispensing system described herein may embody Camalot® dispensing systems, such as PRODIGY™ dispensers, sold by ITW Electronic Assembly Equipment of Hopkinton, Massachusetts.

Each system, e.g., the stencil printer 10 and the dispensing system 40, includes one or more assembly material paste cartridge to dispense assembly material, such as solder paste, adhesive, encapsulant, epoxy, and underfill material. As noted above, the stencil printer 10 typically prints solder paste on the electronic substrate, e.g., circuit board 29. The print head gantry 20 is configured to include at least one cartridge that is configured to hold and dispense assembly material on the stencil 18. Sensors in association with the controller 14 detect the amount of assembly material on the stencil 18 prior to conducting a stencil wipe operation. Similarly, as further noted above, the dispensing system 40 dispenses assembly material onto the electronic substrate 42 at precise locations on the electronic substrate. Each dispensing unit 44, 46 includes a cartridge that is configured to hold and dispense assembly material on the electronic substrate 42. Such cartridges have a finite volume and are known to work within a certain pressure range to dispense material from the cartridges. It is important to monitor the amount of assembly material contained within the cartridge for a variety of reasons, most notably to know when to replace a cartridge that is running out of assembly material.

Figure 5:
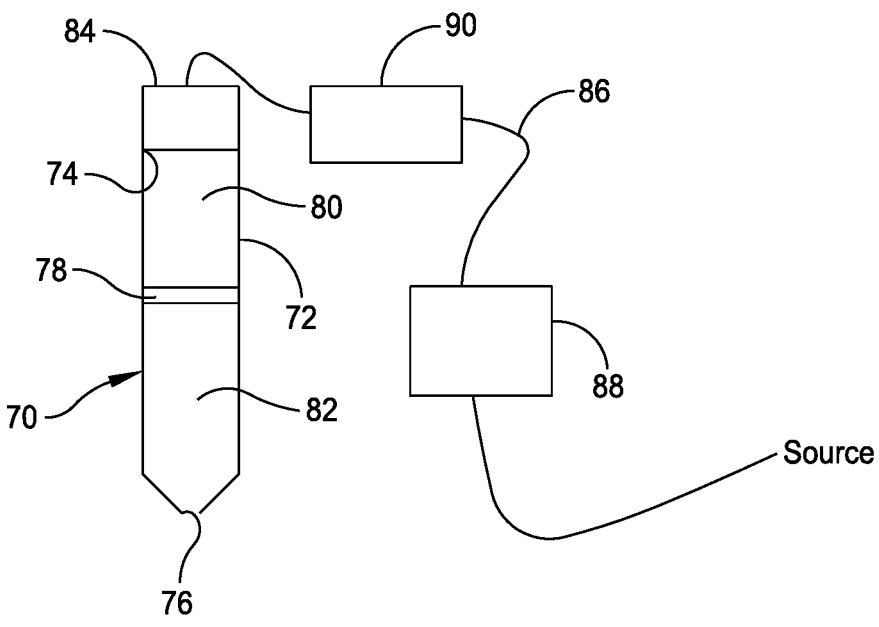
FIG. 5 is a schematic view of a material cartridge and a system to measure static volume in the material cartridge.

Referring to FIG. 5, in one embodiment, an exemplary material container or cartridge is generally indicated at 70. As shown, the cartridge 70 includes a generally cylindrical body 72 having an open upper end 74 and a tapered lower end 76 having a relatively smaller opening to dispense assembly material from the cartridge. The cartridge 70 can be fabricated from a suitable plastic material that is transparent or translucent so that an operator can visually detect how much assembly material is within the cartridge. The material cartridge 70 further includes a piston 78 disposed within the cylindrical body, with the piston being provided to divide the body 72 of the cartridge into an upper chamber 80 and a lower chamber 82. The piston 78 further is provided to apply pressure on assembly material disposed in the lower chamber 82.

The material cartridge 70 further includes a cap or stop 84 provided within the open upper end 74 of the body to enclose the open end of the body 72 of the cartridge. Although not shown, the lower end 76 of the body 72 of the cartridge 70 may include a nozzle or some other component to meter out a controlled amount of assembly material during use. For example, in a stencil printer, such as stencil printer 10, the cartridge is configured to dispense assembly material, e.g., solder paste, between squeegee blades of the print head assembly, e.g., print head assembly 20. In another example, in a dispensing system, such as dispensing system 40, the cartridge is configured to deliver assembly material to the dispenser unit(s), e.g., dispensing units 44, 46.

The cap 84 of the cartridge 70 is connected to a tube 86, which provides pressurized gas, e.g., air, into the body 72 of the cartridge to apply pressurized gas in the upper chamber 80 above the piston 78 to force assembly material out of the cartridge through the lower end 76. The tube 86 is connected to a pressure regulator 88 to maintain a desired pressure on the gas being delivered to the upper chamber 80 above the piston 78 within the body 72 of the cartridge 70. In one embodiment, by way of example, air is delivered to the pressure regulator 88 from a source of compressed air at 100 pounds per square inch (psi), and the pressure regulator is configured to reduce the air pressure to a desired pressure, e.g., 60 psi, when delivering the air through the tube 86 to the upper chamber 80 above the piston 78 within the body 72 of the cartridge 70. It should be understood that the pressure regulator 88 can be configured to deliver a desired pressure to the cartridge.

The purpose of providing air pressure to the upper chamber 80 above the piston 78 is to force material out of the lower chamber 82 of the body 72 of the cartridge. Thus, assembly material in the lower chamber 82 below the piston 78 is replaced by air in the upper chamber 80 above the piston as material is dispensed from the cartridge 70 by moving the piston downwardly through the body 72 of the cartridge.

As shown, in one embodiment, a system of detecting static volume in the material cartridge 70 includes a mass flow meter 90 placed downstream from the pressure regulator 88 in fluid communication with the tube 86 to measure the flow rate of air through the tube. It should be noted that the mass flow meter 90 can be placed upstream from the regulator 88 and fall within the scope of the present disclosure. In one embodiment, the flow rate is measured for a calculated time interval to determine the volume of empty space within the cartridge 70 occupied by air as it enters the upper chamber 80 above the piston 78 within the body 72 of the cartridge. By measuring the volume of air delivered to the cartridge 70 in the upper chamber 80 above the piston 78, the volume of assembly material in the lower chamber 82 below the piston of the body 72 of the cartridge is determined. Thus, an accurate determination of an amount of material within the cartridge 70 can be provided.

Figure 6:
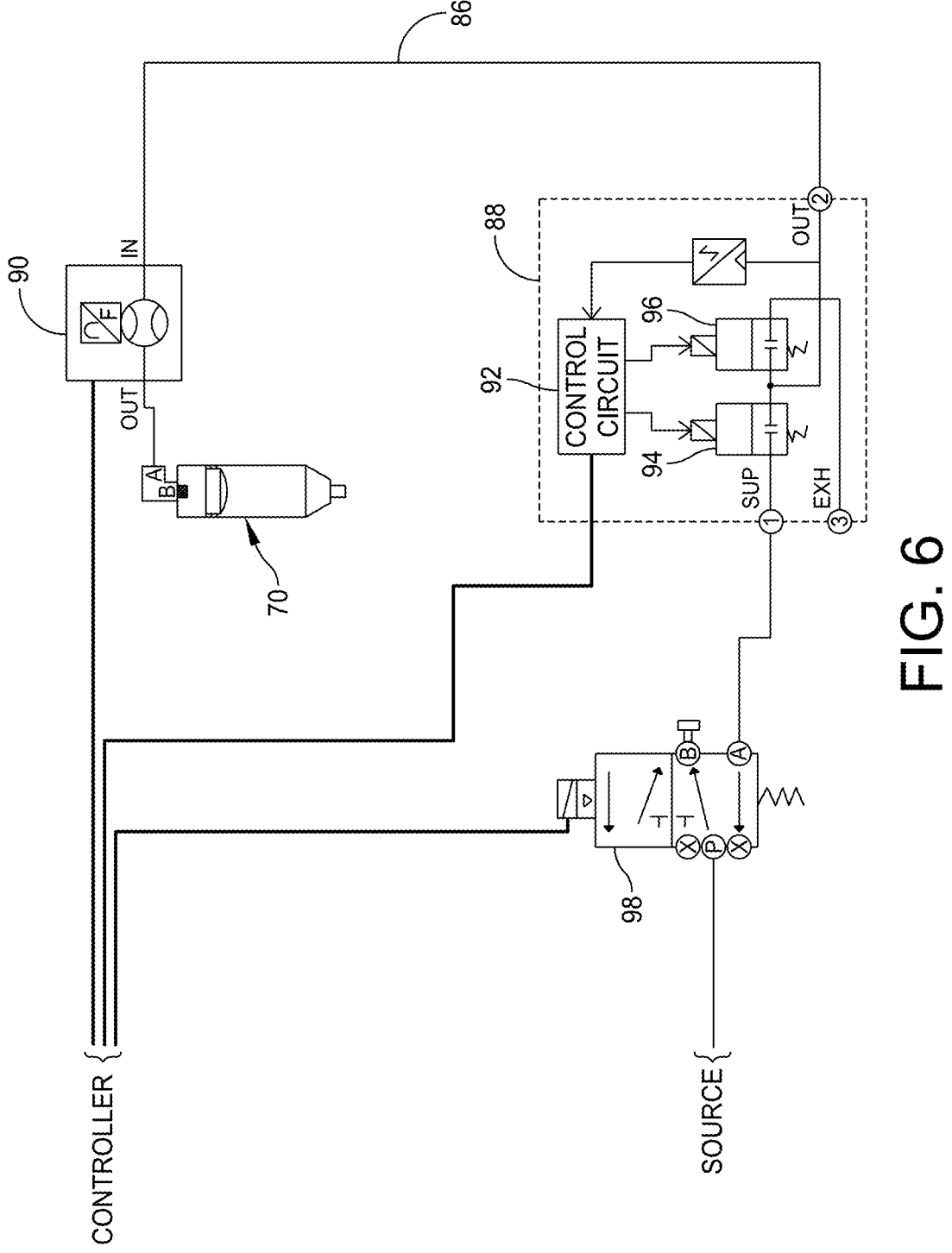
FIG. 6 is a schematic diagram of the system to measure static volume in the material cartridge.

Referring to FIG. 6, in one embodiment, the pressure regulator 88 embodies an electric-pneumatic pressure regulator including a control circuit 92 coupled to the controller, e.g., controller 14, 48, a first control valve 94, and a second control valve 96, with the first control valve and the second control valve being coupled to the control circuit. A source of air pressure is connected to the pressure regulator 88 by a solenoid valve 98, which is coupled to the controller, e.g., controller 14, 48. The arrangement is such that pressurized air enters the pressure regulator 88 through the solenoid valve 98 and is conditioned by the first control valve 94 and the second control valve 96 of the pressure regulator to produce pressurized air at a desired pressure. The controller, e.g., controller 14, 48, provides control information to the solenoid valve 96 to deliver air to the pressure regulator 88 and to the control circuit 92 of the pressure regulator to deliver pressurized air to the cartridge 70 at a desired pressure through the tube 86. The mass flow meter 90 is positioned between the pressure regulator 88 and the cartridge 70. In one embodiment, the pressure regulator 88 can be a digital electronic pressure regulator.

In one embodiment, the system can be configured to enable a user to enter a known working pressure within a process program that a controller, e.g., controller 14 or controller 48, of the assembly apparatus uses for manual regulators. The system further can be configured to use a digital regulator upon which the commanded pressure is known to the process to determine the timed flow rate of compressed gas at a known temperature. In one example, the known temperature of the compressed air is 25° C. The system can include a suitable temperature sensor to measure temperature of the compressed gas. Once an empty volume of the cartridge is known, the empty volume can be subtracted from the full volume of the cartridge to determine actual volume. This method can be executed at the end of material being dispensed (recharge).

A calculated time interval is predetermined for the size of the cartridge. In one example for a 600 gram cartridge, a calculated time interval can be 2 seconds or less. However, the time interval should be long enough to ensure that material exits the cartridge. Different sized cartridges, e.g., a 1200 gram cartridge, can be utilized as well. Material cartridges typically used on dispensing systems are much smaller and will have a much shorter sample time.

In one embodiment, information on how much assembly material is used in the cartridge and the time period in which the assembly material is used can be determined by the controller (e.g., controller 14, 48). This information can be shared with a manufacturing execution system (MES) or customer database associated with the assembly equipment. This information can be used to optimize the performance of the assembly equipment. For example, time frames for replacement of cartridges can be determined, the storage of replacement cartridges can be calculated, etc. In one particular example, a notification system can be implemented to provide replacement and inventory updates. Storage and on-time deliveries of cartridges to the assembly apparatus can be optimized since consumption rates are determined in real-time.

A method to detect static volume in the material cartridge includes measuring a volume of air delivered to a material cartridge. The controller is configured to determine a volume of assembly material in the material cartridge upon determining the volume of air in the material cartridge. The method includes measuring the volume of air with a mass flow meter positioned between the material cartridge and a pressure regulator. As noted above, the mass flow meter can be positioned prior to the pressure regulator. In one embodiment, the method further includes providing pressurized air into a chamber above the piston to force assembly material out of the cartridge, and positioning the mass flow meter between the pressure regulator and the cap of the cartridge. Specifically, the method further includes positioning the mass flow meter downstream from the pressure regulator to measure a flow rate of air through the tube for a calculated time interval to determine the volume of empty space within the chamber above the piston within the body of the cartridge to determine the volume of assembly material in the chamber below the piston within the body of the cartridge.

Advanced methods can include sampling the volume of air at the beginning of the automated dispense (recharge) and then record the mass flow at a given PSI and extrapolate the amount of material dispensed during the automated dispense process (recharge).

Leak detection can also be determined by monitoring the mass air flow before and after the automated dispense (before and after recharge) which should be zero flow if there are no leaks.

Various controllers, such as the controllers 14 and 48, may execute various operations discussed above. Using data stored in associated memory and/or storage, the controller 14, 48 also executes one or more instructions stored on one or more non-transitory computer-readable media, which the controller 14, 48 may include and/or be coupled to, that may result in manipulated data. In some examples, the controller 14, 48 may include one or more processors or other types of controllers. In one example, the controller 14, 48 is or includes at least one processor. In another example, the controller 14, 48 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. An apparatus configured to dispense assembly material on an electronic substrate, the apparatus comprising:
 a frame;
 a unit coupled to the frame, the unit being configured to deposit assembly material on the electronic substrate, the unit including a material cartridge coupled to a pressure regulator by a valve, the pressure regulator being configured to deliver pressurized air to the material cartridge at a desired pressure, the material cartridge being configured to contain assembly material;
 a substrate support assembly coupled to the frame, the substrate support assembly being configured to support the electronic substrate;
 a controller coupled to the unit, including the pressure regulator and the valve, the controller being configured to control the apparatus including the unit; and
 a system to detect static volume in the material cartridge, the system including a mass flow meter to measure a volume of air delivered to the material cartridge,
 wherein the pressure regulator includes a control circuit coupled to the controller, a first control valve, and a second control valve, the first control valve and the second control valve being coupled to the control circuit and configured to condition the pressurized air at a desired pressure,
 wherein the controller further is configured to determine a volume of assembly material in the material cartridge upon determining the volume of air in the material cartridge.

2. The apparatus of claim 1, wherein the cartridge includes a cylindrical body having an open upper end and a tapered lower end having a relatively smaller opening to dispense assembly material from the cartridge.

3. The apparatus of claim 2, wherein the cartridge further includes a piston disposed within the cylindrical body, with the piston providing pressure on assembly material disposed in a chamber below the piston.

4. The apparatus of claim 3, wherein the cartridge further includes a cap provided within the open end of the body to enclose the open end of the cartridge.

5. The apparatus of claim 4, wherein the cap of the cartridge is connected to a tube in fluid communication with the pressure regulator to provide pressurized air into a chamber above the piston to force assembly material out of the cartridge.

6. The apparatus of claim 5, wherein the mass flow meter is disposed between the pressure regulator and the cartridge.

7. The apparatus of claim 5, wherein the mass flow meter is placed downstream from the pressure regulator to measure a flow rate of air through the tube for a calculated time interval to determine the volume of empty space within the chamber above the piston within the body of the cartridge to determine the volume of assembly material in the chamber below the piston within the body of the cartridge.

8. The apparatus of claim 2, wherein the lower end of the body includes a nozzle to meter out a controlled amount of assembly material during use.

9. The apparatus of claim 2, wherein the cartridge is fabricated from a plastic material that is transparent or translucent to enable visual detection of an amount of assembly material in the cartridge.

10. The apparatus of claim 1, wherein a source of air pressure is connected to the pressure regulator by a solenoid valve, which is coupled to the controller.

11. The apparatus of claim 1, wherein the controller further is configured to determine a replacement schedule for the material cartridge and to provide notification.

12. A system to detect static volume in the material cartridge coupled to a pressure regulator by a valve, the pressure regulator being configured to deliver pressurized air to the material cartridge at a desired pressure, the material cartridge being configured to contain assembly material, the system comprising:
 a mass flow meter to measure a volume of air delivered to the material cartridge,
 wherein a controller is configured to determine a volume of assembly material in the material cartridge upon determining the volume of air in the material cartridge, the controller being coupled to the unit, including the pressure regulator and the valve, the controller being configured to control the apparatus including the unit,
 wherein the pressure regulator includes a control circuit coupled to the controller, a first control valve, and a second control valve, the first control valve and the second control valve being coupled to the control circuit and configured to condition the pressurized air at a desired pressure.

13. The system of claim 12, wherein the cartridge includes a cylindrical body having an open upper end and a tapered lower end having a relatively smaller opening to dispense assembly material from the cartridge.

14. The system of claim 13, wherein the cartridge further includes a piston disposed within the cylindrical body, the piston providing pressure on assembly material disposed in a chamber below the piston.

15. The system of claim 14, wherein the cartridge further includes a cap provided within the open end of the body to enclose the open end of the cartridge.

16. The system of claim 15, wherein the cap of the cartridge is connected to a tube in fluid communication with the pressure regulator to provide pressurized air into a chamber above the piston to force assembly material out of the cartridge.

17. The system of claim 16, wherein the mass flow meter is disposed between the pressure regulator and the cartridge.

18. The system of claim 16, wherein the mass flow meter is placed downstream from the pressure regulator to measure a flow rate of air through the tube for a calculated time interval to determine the volume of empty space within the chamber above the piston within the body of the cartridge to determine the volume of assembly material in the chamber below the piston within the body of the cartridge.

19. The system of claim 13, wherein the lower end of the body includes a nozzle to meter out a controlled amount of assembly material during use.

20. The system of claim 13, wherein the cartridge is fabricated from a plastic material that is transparent or translucent to enable visual detection of an amount of assembly material in the cartridge.

21. The system of claim 12, wherein a source of air pressure is connected to the pressure regulator by a solenoid valve, which is coupled to the controller.

22. The system of claim 12, wherein the controller further is configured to determine a replacement schedule for the material cartridge and to provide notification.

23. A method to detect static volume in the material cartridge coupled to a pressure regulator by a valve, the pressure regulator being configured to deliver pressurized air to the material cartridge at a desired pressure, the material cartridge being configured to contain assembly material, the method comprising:

measuring a volume of air delivered to a material cartridge, wherein a controller is configured to determine a volume of assembly material in the material cartridge upon determining the volume of air in the material cartridge, the controller being coupled to the unit, including the pressure regulator and the valve, the controller being configured to control the apparatus including the unit, wherein the pressure regulator includes a control circuit coupled to the controller, a first control valve, and a second control valve, the first control valve and the second control valve being coupled to the control circuit and configured to condition the pressurized air at a desired pressure.

24. The method of claim 23, wherein measuring a volume of air is performed by a mass flow meter positioned between the material cartridge and a pressure regulator.

25. The method of claim 24, wherein the cartridge includes a cylindrical body having an open upper end and a tapered lower end having a relatively smaller opening to dispense assembly material from the cartridge, a piston disposed within the cylindrical body, the piston providing pressure on assembly material disposed in a chamber below the piston, and a cap provided within the open end of the body to enclose the open end of the cartridge.

26. The method of claim 25, further comprising providing pressurized air into a chamber above the piston to force assembly material out of the cartridge.

27. The method of claim 25, further comprising positioning the mass flow meter between the pressure regulator and the cartridge.

28. The method of claim 25, further comprising positioning the mass flow meter downstream from the pressure regulator to measure a flow rate of air through the tube for a calculated time interval to determine the volume of empty space within the chamber above the piston within the body of the cartridge to determine the volume of assembly material in the chamber below the piston within the body of the cartridge.

*   *   *   *   *